US007739932B2

(12) United States Patent
Kraenzler et al.

(10) Patent No.: US 7,739,932 B2
(45) Date of Patent: Jun. 22, 2010

(54) TOOL-HOLDING DEVICE

(75) Inventors: Ernst Kraenzler, Leinfelden-Echterdingen (DE); Peter Stierle, Waldenbuch (DE); Albrecht Hofmann, Steinbronn (DE); Juergen Wiker, Leinfelden-Echterdingen (DE); Harald Krondorfer, Mundelein, IL (US); Joachim Schadow, Dettenhausen (DE); Sinisa Andrasic, Schoenaich (DE); Thomas Schomisch, Filderstadt (DE); Christof Hoelzl, Vomp (AT); Johann Huber, Kramsach (AT); Marcus Heckmann, Leinfelden-Echterdingen (DE); Kirsten Heckmann, legal representative, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 10/564,668

(22) PCT Filed: Sep. 24, 2004
(Under 37 CFR 1.47)

(86) PCT No.: PCT/DE2004/002131

§ 371 (c)(1),
(2), (4) Date: Apr. 26, 2007

(87) PCT Pub. No.: WO2005/049271

PCT Pub. Date: Jun. 2, 2005

(65) Prior Publication Data

US 2007/0272064 A1 Nov. 29, 2007

(30) Foreign Application Priority Data

Nov. 8, 2003 (DE) ................................ 103 52 288

(51) Int. Cl.
*B23B 1/00* (2006.01)
*B23B 29/14* (2006.01)

(52) U.S. Cl. ........................................ 82/160; 464/100

(58) Field of Classification Search .................. 82/151, 82/160, 168, 165, 162, 1.11; 464/95, 51, 464/100; 279/79
See application file for complete search history.

(56) References Cited

U.S. PATENT DOCUMENTS

| | | | | | |
|---|---|---|---|---|---|
| 4,919,023 | A * | 4/1990 | Bloink | ........................ | 82/160 |
| 5,054,344 | A * | 10/1991 | Erickson et al. | ............... | 82/160 |
| 6,145,419 | A * | 11/2000 | Laycock | ..................... | 82/1.11 |
| 7,322,779 | B2 * | 1/2008 | Kress et al. | ................. | 409/234 |
| 2002/0083807 | A1 * | 7/2002 | Gascoyne | .................... | 82/160 |
| 2004/0012160 | A1 | 1/2004 | Krondorfer et al. | | |

FOREIGN PATENT DOCUMENTS

| | | |
|---|---|---|
| DE | 101 36 459 | 2/2003 |
| WO | 03/097299 | 11/2003 |

* cited by examiner

*Primary Examiner*—Will Fridie, Jr.
(74) *Attorney, Agent, or Firm*—Michael J. Striker

(57) ABSTRACT

A tool-holding device for an insert tool (14) equipped with an at least essentially disk-shaped hub (42), in particular for a hand-guided angle grinder (32) or a hand-guided circular saw, having a drive device (12) that includes a leaf spring unit (58) and is able to clamp the insert tool (14) in the axial direction (64).

Figure 1:
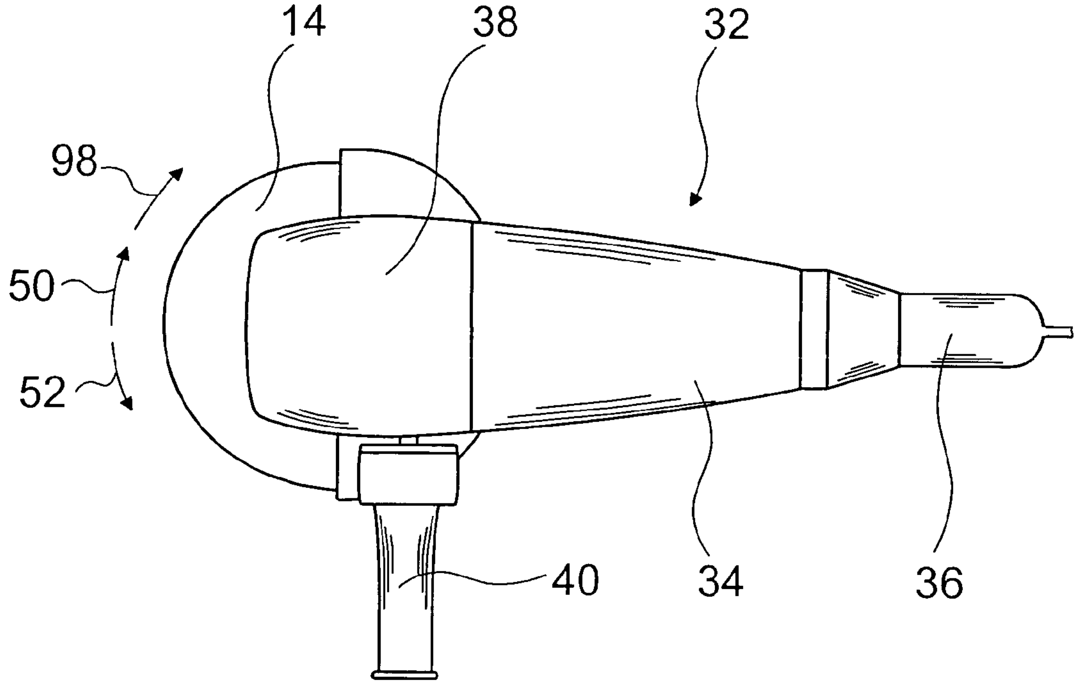

The leaf spring unit (58) has at least one freely extending spring piece (110) that extends at least partially in the circumference direction (50, 52).

10 Claims, 3 Drawing Sheets

TOOL-HOLDING DEVICE

PRIOR ART

The present invention is based in particular on a tool-holding device according to the preamble to claim 1.

DE 101 36 459 A1 has disclosed a species-defining tool-holding device of a hand-guided angle grinder for an insert tool with a disk-shaped hub. The tool-holding device has a drive device equipped with a leaf spring by means of which the insert tool can be clamped in the axial direction.

ADVANTAGES OF THE INVENTION

The present invention is based on a tool-holding device for an insert tool with an essentially disk-shaped hub, in particular for a hand-guided angle grinder or a hand-guided circular saw, having a drive device that includes a leaf spring and is able to clamp the insert tool in the axial direction.

According to one embodiment, the leaf spring unit has at least one freely extending spring piece that extends at least partially in the circumference direction, which makes it possible to inexpensively produce a space-saving leaf spring unit that has an easy-to-manufacture contour and achieves an advantageous transmission of force. In this context, the term "freely extending spring piece" is understood to be a spring piece with at least one freely extending end.

If the spring piece is connected to a retaining ring by means of at least one connecting piece extending at least essentially in the radial direction, in particular radially inward, then it is possible to achieve an advantageous stress curve in the leaf spring unit that is particularly easy to predetermine. Basically, however, the spring piece could also extend outward and/or inward essentially without a radial connecting piece, for example in a spiral shape.

The spring piece can be comprised of an additional component attached to a retaining ring or can be, at least partially, integrally joined to it, which makes it possible to reduce the number of additional components and cut costs.

In addition, the connecting piece and the spring piece are embodied as at least essentially T-shaped and/or the width of the spring piece decreases toward its free end. It is possible to achieve an easy-to-predetermine stress curve in the leaf spring unit as well as an advantageous stress distribution and a resulting, advantageous utilization of material.

If the spring piece has a contact surface comprised of a flattened area formed onto its free end, then it is advantageously possible to assure a transmission of force over a large surface area and as a result, a low surface pressure, a low wear, and a long service life.

In another embodiment of the invention, the spring piece has a thickness of between 0.7 mm and 1.1 mm, which permits the achievement of a powerful spring force, with an advantageous combination of material costs and manufacturing costs.

The leaf spring unit also has at least one encoding means that corresponds to at least one component of the drive device during installation to prevent an incorrect installation of the leaf spring unit, the term "incorrect installation" being understood to mean a laterally offset installation. This makes it possible to avoid damage and functional impairments due to incorrect installation.

The tool-holding device advantageously includes a drive shaft that has at least one form-locking element formed onto it in a non-cutting manner in order to connect it in a form-locked manner in the circumference direction to a drive torque-transmitting mechanism, in particular a drive flange, of the drive device. A structurally simple, inexpensive connection between the drive shaft, the drive device, and the insert tool can be achieved that is able to transmit powerful torques, particularly in that large transmission surface areas can be inexpensively achieved at least without significant material weakening. The design according to the invention is thus particularly suited for high-powered machines, in particular for line-powered machines. The drive shaft can essentially be constituted by a motor shaft, an output shaft of a transmission, in particular an angle transmission, or by a shaft that adjoins an output shaft of a transmission in the direction toward the insert tool.

The form-locking element can be constituted by an integrally formed groove in which an additional, for example tooth-like transmission mechanism can be fastened, which permits the material properties of this transmission mechanism to be selectively brought into line with the existing stresses, or the form-locking element can advantageously be used to directly contact the mechanism of the drive device, which makes it possible to reduce the number of additional components, complexity of assembly, and costs.

If the form-locking element is formed onto the drive shaft by means of a pressing procedure, then this can be advantageously implemented inexpensively and within strict tolerances. In addition to a pressing procedure, however, there are also other conceivable methods that those skilled in the art will deem suitable for forming the form-locking element onto the drive shaft in a non-cutting fashion, for example a casting process, etc.

DRAWINGS

Other advantages ensue from the following description of the drawings. The drawings show an exemplary embodiment of the present invention. The drawings, the specification, and the claims contain numerous features in combination. Those skilled in the art will also suitably consider the features individually and unite them in other meaningful combinations.

Figure 2:
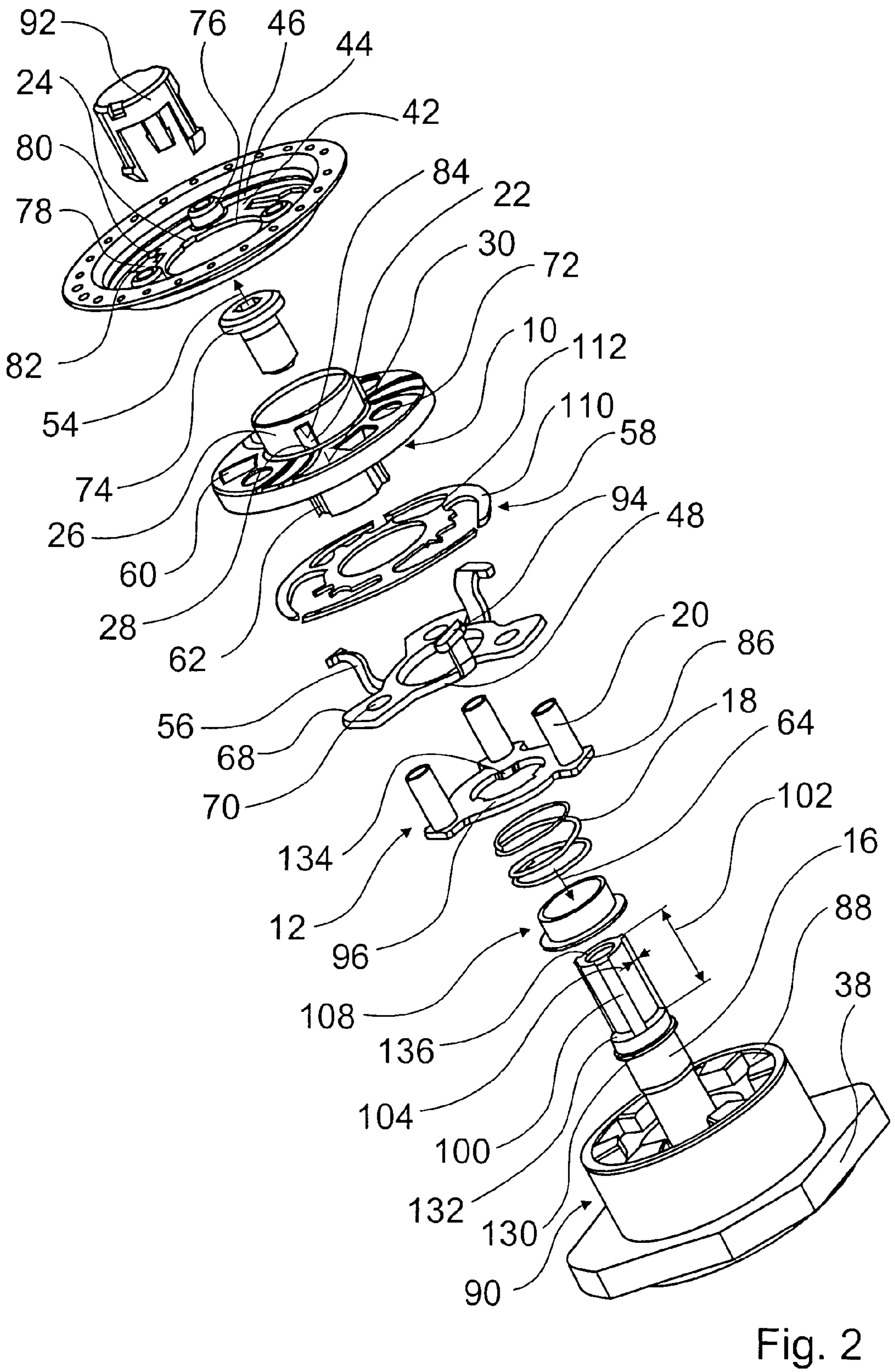
Figure 3:
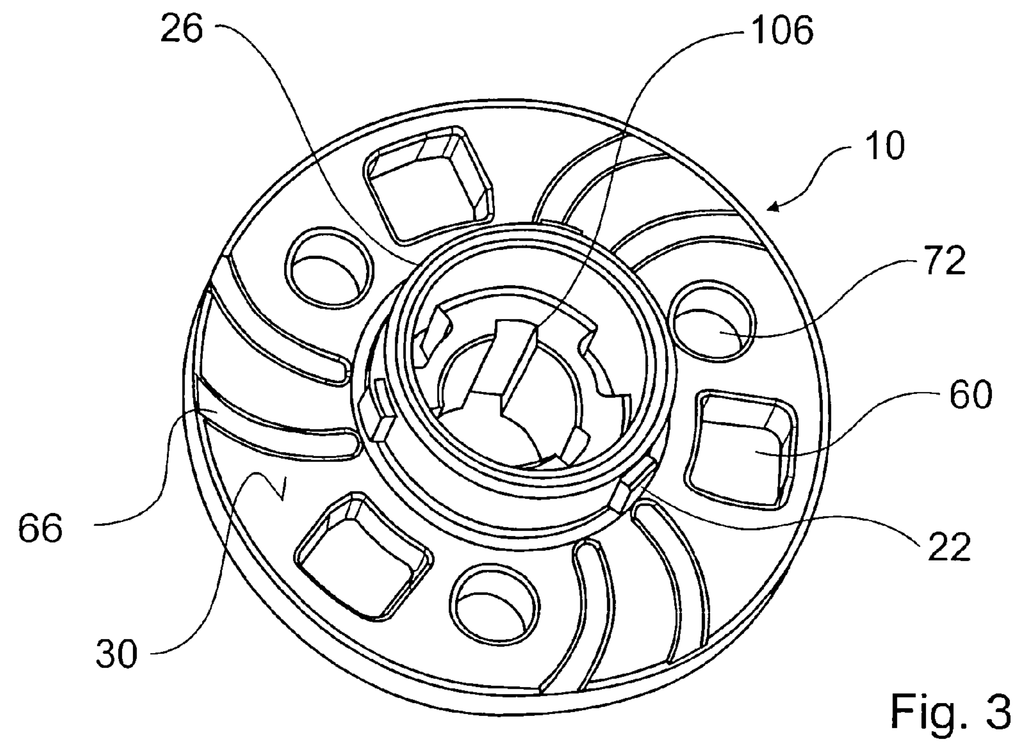
Figure 4:
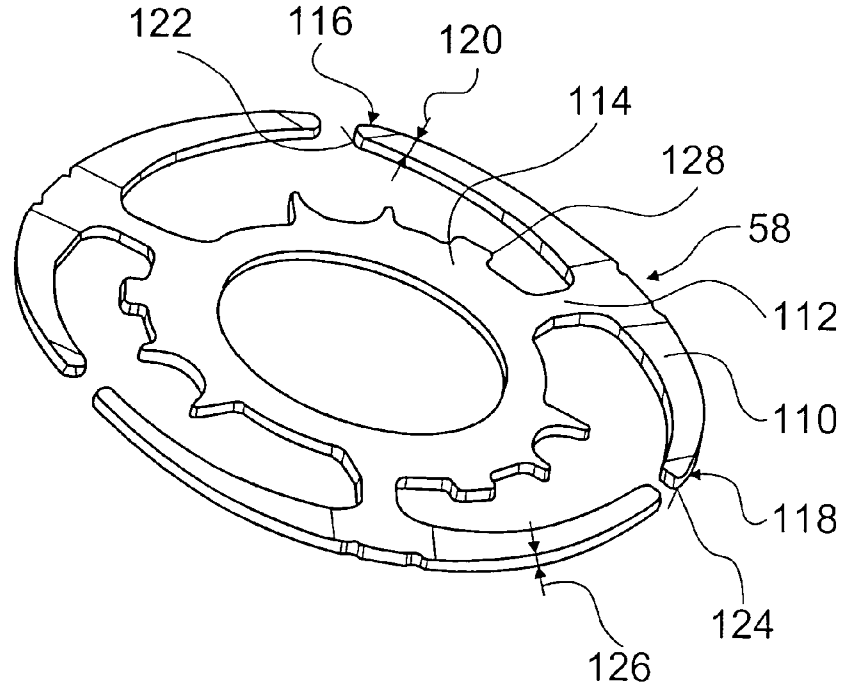

FIG. 1 schematically depicts a top view of an angle grinder,

FIG. 2 is an exploded view of a tool-holding device with a hub of an insert tool, FIG. 3 is an enlarged depiction of a drive flange from FIG. 2, and FIG. 4 is an enlarged depiction of a leaf spring unit from FIG. 2.

DESCRIPTION OF THE EXEMPLARY EMBODIMENT

FIG. 1 shows a top view of an angle grinder 32 with an electric motor, not shown in detail, supported in a housing 34. The angle grinder 32 can be guided by means of a first handle 36 extending in the longitudinal direction and integrated into the housing 34 at an end oriented away from the insert tool 14 and by means of a second handle 40 extending transversely in relation to the longitudinal direction, attached to the transmission housing 38 in the region of the insert tool 14. The electric motor can drive the insert tool 14 to rotate via an angle transmission, not shown in detail, and a tool-holding device that includes a drive shaft 16 and a drive device 12 (FIG. 2).

For drive torque transmission, the drive shaft 16 comprised of an output shaft of the angle transmission, at its free end, has three form-locking elements 100 formed onto it in a non-cutting way by means of an extrusion process for a form-locked connection in the circumference direction 50, 52 to a drive flange 10 that constitutes a contact surface 30 for the insert tool 14. After the extrusion process, an internal thread 140 is let into the drive shaft 16, the drive shaft 16 is remachined by means of turning, then case hardened, and then ground in certain regions, particularly in bearing regions.

The form-locking elements 100 have a longitudinal span 102 in the axial direction 64 of the drive shaft 16 that is greater than their height 104 and are embodied with a rectangular cross sectional area.

In the assembled state, the form-locking elements 100 of the drive shaft 16, in order to transmit drive torque directly to the drive flange 10, engage in form-locking elements 106 constituted by continuous axial grooves (FIGS. 2 and 3) formed into the inner circumference of the drive flange 10, which is comprised of a sintered component. The drive flange 10 is centered by the outer surfaces of the form-locking elements 100 oriented radially outward.

In the axial direction 64, the drive flange 10 is supported on a collar 130 of the drive shaft 16 by means of a spacer element 108 embodied in the form of a sleeve. The spacer element 108 covers over a manufacture-induced transition 132 between a region at the free end of the drive shaft 16 characterized by the form-locking elements 100 and a region adjoining it in the axial direction 64.

On a side oriented toward the insert tool 14, the drive flange 10 has a collar 26 formed onto it, which radially centers the insert tool 14 with its centering bore 46 when the insert tool is in the installed position. The collar 26 has three shaped elements 22 situated on it, which are constituted by projections extending radially outward. The shaped elements 22 integrally joined to the collar 26 are distributed uniformly around an outer circumference of the collar 26 and in the axial direction 54, 64, are spaced a distance 28 apart from the contact surface 30. With its end oriented toward the insert tool 14, the collar 26 protrudes beyond the shaped elements 22 in the axial direction 54.

On a side of the drive flange 10 oriented away from the insert tool 14, there is a sheet metal plate 48 equipped with three clamping hooks 56 integrally formed onto it that are uniformly distributed in the circumference direction 50, 52 and extend in the axial direction 54, which are for axially fixing the insert tool 14. The clamping hooks 56 are formed onto the sheet metal plate 48 in a bending process.

During assembly of the drive device 12, the drive flange 10, a leaf spring unit 58, and the sheet metal plate 48 are preassembled. To accomplish this, the leaf spring unit 58 is slid onto a collar of the drive flange 10 that points in the direction away from the insert tool 14. Then, the clamping hooks 56 of the sheet metal plate 48, whose free ends have a hook-shaped extension with an inclined surface 94 oriented in the circumference direction 52, are guided in the axial direction 54 through openings 60 in the drive flange 10 (FIGS. 2 and 3). By pressing the sheet metal plate 48 and the drive flange 10 together and rotating them in relation to each other, the leaf spring unit 58 is preloaded and the sheet metal plate 48 and drive flange 10 are connected in a form-locked manner in the axial direction 54, 64 (FIGS. 2 and 3). The sheet metal plate 48, loaded by the leaf spring unit 58, is then supported against the contact surface 30 of the drive flange 10 via edges of the hook-shaped extensions, which point axially in the direction away from the insert tool 14.

The leaf spring unit 58 has three structurally identical, freely extending spring pieces 110 extending in the circumference direction 50, 52, each of which is connected integrally to a retaining ring 114 by means of a connecting piece 112 extending radially inward (FIG. 4). The connecting piece 112 and the spring piece 110 are essentially T-shaped, the spring piece 110 extending in an arc shape with two free ends and the connecting piece 112 adjoining the spring piece 110 in its middle. The spring piece 110 has a width 120 that decreases towards its free ends 116, 118 and has a thickness 126 of approx. 0.9 mm. The leaf spring unit 58 rests with its retaining ring 114 against the drive flange 10; starting from the connecting piece 112 and extending toward their free ends 116, 118, the spring pieces 110 are each curved in the direction oriented away from the drive flange 10 and are supported against the tabs 68 of the sheet metal plate 48. In order to avoid a linear contact, contact surfaces 122, 124 that are comprised of flattened areas are formed onto the free ends 116, 118 or else the free ends 116, 118 of the spring pieces 110 are bent slightly in the direction of the drive flange 10.

In order to prevent an incorrect assembly, in particular a laterally offset installation of the leaf spring unit 58, next to the connecting pieces 112, the outer circumference of the retaining ring 14 has encoding means 128 formed onto it, which extend radially outward and correspond to the clamping hooks 56 and pins 20 of the drive device 12 during assembly. If the leaf spring unit 58 is installed in a laterally offset position, the clamping hooks 56 of the sheet metal plate 48 can in fact be guided through recesses in the leaf spring unit 58 in a laterally offset position, but then the pins 20 of a drive disk 96 can no longer be guided through the leaf spring unit 58 due to the presence of the encoding means 128.

After the sheet metal plate 48 with the clamping hooks 56 formed onto it, the leaf spring unit 58, and the drive flange 10 have been preassembled, then a spring element 18 comprised of a helical compression spring and the drive disk 96 with its three pins 20, which are distributed uniformly over the circumference and extend in the axial direction 54, are slid onto the drive shaft 16 (FIG. 2).

Then, the preassembled unit comprised of the sheet metal plate 48, the leaf spring unit 58, and the drive flange 10 is mounted onto the drive shaft 16. During assembly, the pins 20 are guided by tabs 68, which are formed onto the circumference of the sheet metal plate 48 and contain bores 70, and are also guided by bores 72, which are situated in the drive flange 10; in the assembled state, the pins 20 reach through the bores 72. The form-locking elements 100 on the drive shaft 16 are inserted into the form-locking elements 106 of the drive flange 10. In addition, shapes 134 extending radially inward from the inner circumference of the drive disk 96 are inserted into grooves 136 let into the outer circumference of the drive flange 10. The pins 20 prevent the sheet metal plate 48 and drive disk 96 from rotating in relation to each other.

The drive device 12 is secured to the drive shaft 16 with a screw 74. The insert tool 14 comprised of a cutting wheel has an essentially disk-shaped sheet metal hub 42 comprised of a separate component, which has three cup-shaped recesses 76 uniformly distributed one after another in the circumference direction 50, 52 and extending in the axial direction 54, whose diameter is slightly larger than the diameter of the pins 20. The sheet metal hub 42 also has three openings 78 that are uniformly distributed in the circumference direction 50, 52 and extend in the circumference direction 50, 52, each having a narrow region 80 and a wide region 82.

The diameter of the centering bore 46 of the sheet metal hub 42 is selected so that it is also possible to clamp the insert tool 14 to a conventional angle grinder using a conventional clamping system equipped with a clamping flange and a spindle nut. This assures so-called backward compatibility.

The sheet metal hub 42 of the insert tool 14 has three shaped elements 24, which are distributed uniformly in the circumference direction 50, 52 over the circumference of the centering bore 46 (FIG. 2). The shaped elements 24 here are embodied in the form of recesses.

The shaped elements 22 of the tool-holding device and the shaped elements 24 of the insert tool 14 are reciprocally matching, corresponding shaped elements designed to facilitate mounting of the insert tool 14. In addition, the corresponding shaped elements 22, 24 constitute an encoding means to prevent installation of an inadmissible insert tool of the same kind. To this end, the corresponding shaped elements 22, 24 are matched to each other with regard to a diameter of the insert tool 14 so that insert tools intended for insertion into high-speed machines have a wide shaped element or a wide encoding means and insert tools intended for insertion into lower-speed machines have a narrow shaped element or a narrow encoding means.

The sheet metal hub 42 of the insert tool 14 is firmly attached to and pressed together with an abrasive via a riveted connection and is cup-shaped due to the presence of a formation 44 oriented in the axial direction 64.

When the insert tool 14 is being mounted, the insert tool 14 is slid with its centering bore 46 onto the part of the collar 26 protruding beyond the shaped elements 22 in the axial direction 54 and is radially precentered. In the process of this, the insert tool 14 comes to rest against contact surfaces 84 of the shaped elements 22. Rotating the insert tool 14 in the circumference direction 50, 52 brings the shaped elements 22, 24 into alignment. The insert tool 14 and/or the sheet metal hub 42 can then slide in the axial direction 64 toward the contact surface 30 and the sheet metal hub 42 comes to rest against the pins 20.

A subsequent pressing of the sheet metal hub 42 against the contact surface 30 of the drive flange 10 causes the pins 20 to slide into the bores 72 and causes the drive disk 96 to be slid axially in the direction 64 oriented away from the insert tool 14, counter to a spring force of the spring element 18 on the drive shaft 16. This causes shapes 86 oriented radially outward on the drive disk 96 to travel into corresponding locking pockets 88 of a support flange 90 connected to the transmission housing 38 and lock the drive shaft 16.

When the sheet metal hub 42 is pressed down against the contact surface 30, the clamping hooks 56 automatically travel into in the wide regions 82 of the openings 78 in the sheet metal hub 42.

If the hook-shaped extensions of the clamping hooks 56 are guided through the wide regions 82 of the openings 78 of the sheet metal hub 42 and the sheet metal hub 42 is fully depressed, then the sheet metal hub 42 can be rotated counter to a drive direction 98. The rotation of the sheet metal hub 42 on the one hand permits the rim of the centering bore 46 of the sheet metal hub 42 to be slid into the space 28 between the shaped elements 22 and the contact surface 30 of the drive flange 10 and also permits the shaped elements 22 to prevent it from falling down in the axial direction. On the other hand, the rotation of the sheet metal hub 42 causes the hook-shaped extensions to slide into the arc-shaped, narrow regions 80 of the openings 78 of the sheet metal hub 42. In the course of this, beveled surfaces that are not shown in detail allow the sheet metal plate 48 with the clamping hooks 56 to slide axially in the direction 54, counter to the pressure of the leaf spring unit 58, until the contact surfaces of the hook-shaped extensions come to rest in the arc-shaped, narrow regions 80 situated laterally next to the openings 78 of the sheet metal hub 42. For self-cleaning purposes, the contact surface 30 of the drive flange 10 is provided with arc-shaped grooves 138, which can convey undesirable particles on the contact surface 30 outward, ejecting them from the drive device 12.

In an operating position of the insert tool 14, the pressure of the spring element 18 causes the drive disk 96 to slide upward. The pins 20 engage in the cup-shaped recesses 76 of the sheet metal hub 42 and secure it in a form-locked manner in the circumference direction 50, 52. At the same time, the shapes 86 of the drive disk 96 disengage from the locking pockets 88 of the support flange 90 and release the drive shaft 16.

In order to remove the insert tool 14, a release button 92 is pushed in the axial direction 64. The release button 92 presses to the drive disk 96 in the axial direction 64 and the shapes 86 of the drive disk 96 engage with the locking pockets 88. The drive shaft 16 is locked in position. This causes the pins 20 to disengage from the recesses 76 of the sheet metal hub 42, permitting the sheet metal hub 42 to be rotated in the circumference direction 52 until the clamping hooks 56 can slide a through the openings 78. This causes the shaped elements 22, 24 to move into a corresponding position and permits the sheet metal hub 42 to be removed in the axial direction 54.

10 drive flange
12 drive device
14 insert tool
16 drive shaft
18 spring element
20 locking element
22 shaped element
24 shaped element
26 collar
28 distance
30 contact surface
32 angle grinder
34 housing
36 handle
38 transmission housing
40 handle
42 hub
44 shape
46 centering bore
48 sheet metal plate
50 circumference direction
52 circumference direction
54 axial direction
56 clamping hook
58 leaf spring unit
60 opening
62 region
64 axial direction
66 region
68 tab
70 bore
72 bore
74 screw
76 recess
78 opening
80 region
82 region
84 contact surface
86 shape
88 locking pocket
90 support flange
92 release button
94 beveled surface
96 drive disk
98 drive direction
100 form-locking element
102 longitudinal span
104 height
106 form-locking element
108 spacer element
110 spring piece
112 connecting piece

114 retaining ring
116 end
118 end
120 width
122 contact surface
124 contact surface
126 thickness
128 encoding means
130 collar
132 transition
134 shape
136 groove
138 groove
140 internal thread

What is claimed is:

1. A tool-holding device for an insert tool (14) equipped with an essentially disk-shaped hub (42), in particular for a hand-guided angle grinder (32) or a hand-guided circular saw, having a drive device (12) that includes a leaf spring unit (58) and is able to clamp the insert tool (14) in the axial direction (64), wherein the leaf spring unit (58) has at least one freely extending spring piece (110) that extends at least partially in the circumference direction (50, 52) and wherein the leaf spring unit (58) has at least one encoding means (128) that corresponds to at least one component (20, 56) of the drive device (12) during installation in order to prevent an incorrect installation of the leaf spring unit (58).

2. The tool-holding device as recited in claim 1, wherein the spring piece (110) is connected to a retaining ring (114) by means of at least one connecting piece (112) extending at least essentially in the radial direction.

3. The tool-holding device as recited in claim 1, wherein the spring piece (110) is at least partially integrally connected to a retaining ring (114).

4. The tool-holding device as recited in claim 2, wherein the connecting piece (112) and the spring piece (110) are at least essentially T-shaped.

5. The tool-holding device as recited in claim 1, wherein the spring piece (110) has a width (120) that decreases towards its free end (116, 118).

6. The tool-holding device as recited in claim 1, wherein the free end (116, 118) of the spring piece (110) has a contact surface (122, 124), which is comprised of flattened area, formed onto it.

7. The tool-holding device as recited in claim 1, wherein the spring piece (110) has a thickness (126) of between 0.7 mm and 1.1 mm.

8. The tool-holding device as recited in claim 1, characterized by means of a drive shaft (16) that has at least one form-locking element (100) formed onto it in a non-cutting manner in order to connect it in a form-locked manner in the circumference direction (50, 52) to a drive torque-transmitting mechanism of the drive device (12).

9. An angle grinder equipped with a tool-holding device as recited in claim 1.

10. A hand-guided circular saw equipped with a tool-holding device as recited in claim 1.

* * * * *